US008395366B2

(12) United States Patent
Uno

(10) Patent No.: US 8,395,366 B2
(45) Date of Patent: Mar. 12, 2013

(54) POWER FACTOR CORRECTION CONVERTER INCLUDING INPUT CURRENT DETECTING CIRCUIT

(75) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/110,094

(22) Filed: May 18, 2011

(65) Prior Publication Data

US 2011/0216558 A1 Sep. 8, 2011

Related U.S. Application Data

(63) Continuation of application No. PCT/JP2009/060215, filed on Jun. 4, 2009.

(30) Foreign Application Priority Data

Nov. 25, 2008 (JP) ................................. 2008-299058
Apr. 14, 2009 (JP) ................................. 2009-098362

(51) Int. Cl.
G05F 1/00 (2006.01)
H02M 3/335 (2006.01)
H02M 5/45 (2006.01)
H02M 5/458 (2006.01)

(52) U.S. Cl. ..................... 323/284; 323/283; 363/21.09; 363/21.13; 363/37

(58) Field of Classification Search .... 363/21.12–21.14, 363/21.17, 34, 37
See application file for complete search history.

(56) References Cited

U.S. PATENT DOCUMENTS

| 5,179,508 | A | * | 1/1993 | Lange et al. ..................... 363/16 |
| 5,495,164 | A | * | 2/1996 | Heng ............................. 323/222 |
| 5,818,707 | A | | 10/1998 | Seong et al. |
| 2005/0162143 | A1 | * | 7/2005 | Fukumoto et al. ............ 323/284 |
| 2006/0132104 | A1 | * | 6/2006 | Li ................................. 323/207 |
| 2007/0063684 | A1 | * | 3/2007 | Adragna et al. ............... 323/284 |
| 2008/0252269 | A1 | * | 10/2008 | Feldtkeller et al. ........... 323/210 |
| 2008/0291704 | A1 | * | 11/2008 | Chen et al. ...................... 363/37 |
| 2009/0091957 | A1 | * | 4/2009 | Orr et al. ......................... 363/79 |

(Continued)

FOREIGN PATENT DOCUMENTS

| EP | 0 637 789 A1 | 2/1995 |
| EP | 1 198 058 A1 | 4/2002 |

(Continued)

OTHER PUBLICATIONS

Official Communication issued in International Patent Application No. PCT/JP2009/060215, mailed on Sep. 8, 2009.

Primary Examiner — Adolf Berhane
Assistant Examiner — Gary Nash
(74) Attorney, Agent, or Firm — Keating & Bennett, LLP

(57) ABSTRACT

A low-cost PFC converter capable of detecting an inductor current including a DC component and performing appropriate correction of a power factor with low loss includes a diode bridge that rectifies an AC voltage input from an AC input power supply Vac, a series circuit including an inductor and a switching element, a rectifying and smoothing circuit that is connected in parallel to the switching element and that includes a diode and a smoothing capacitor, and a digital signal processing circuit that performs on/off control on the switching element so that an input current input from the AC input power supply Vac has a similar waveform with respect to an AC voltage. A current flowing through the inductor during an off period of the switching element is detected using a current detecting resistor, and a decreased voltage of the current detecting resistor is sampled at the middle of the off period of the switching element, thereby detecting an average value of the input current.

20 Claims, 11 Drawing Sheets

U.S. PATENT DOCUMENTS

2009/0257257 A1* 10/2009 Adragna et al. ............... 363/65
2010/0066337 A1* 3/2010 Gong et al. .................. 323/285

FOREIGN PATENT DOCUMENTS

| | | |
|---|---|---|
| JP | 2-168864 A | 6/1990 |
| JP | 06-074088 U | 10/1994 |
| JP | 07-177746 A | 7/1995 |
| JP | 09-140144 A | 5/1997 |
| JP | 2000-232789 A | 8/2000 |
| JP | 2001-286149 A | 10/2001 |
| JP | 2002-203988 A | 7/2002 |
| JP | 2004-282958 A | 10/2004 |
| JP | 2004-297943 A | 10/2004 |
| JP | 2005-020994 A | 1/2005 |
| JP | 2005-198370 A | 7/2005 |
| JP | 2007-195282 A | 8/2007 |
| JP | 2007-288892 A | 11/2007 |

* cited by examiner

POWER FACTOR CORRECTION CONVERTER INCLUDING INPUT CURRENT DETECTING CIRCUIT

BACKGROUND OF THE INVENTION

1. Field of the Invention

The present invention relates to an alternating current to direct current (AC-DC) converter that receives an AC power supply and that outputs a DC voltage, and particularly, to a power-factor correction (PFC) converter for correcting a power factor.

2. Description of the Related Art

In Japan and Europe, for example, harmonic current control that is classified in accordance with an application or input power is performed. In order to respond to such control, a circuit called a PFC converter is added to a power supply of general home appliances subjected to harmonic current control, whereby measures have been taken to suppress harmonic currents.

In a typical switching power supply device using a commercial AC power supply as an input power supply, the commercial AC power supply is rectified and smoothed so as to be converted to a DC voltage, and switching by a DC-DC converter is performed on the DC voltage. Therefore, an input current is discontinuous and is significantly distorted as compared to a sinusoidal wave. This causes a harmonic current.

For the purpose of suppressing the harmonic current, a PFC converter is provided in a stage after a full-wave rectifier circuit and before a smoothing circuit that includes a smoothing capacitor.

This PFC converter, which includes a chopper circuit, operates so that an input current waveform is similar to an input voltage waveform, i.e., so that the waveforms are sinusoidal waveforms having the same phase. Accordingly, a harmonic current is suppressed to a certain level or lower.

An example configuration of the PFC converter disclosed in Japanese Unexamined Patent Application Publication No. 2004-282958 will be described with reference to FIG. 1.

In the power-factor correction circuit illustrated in FIG. 1, a series circuit including a step-up reactor L1, a switching element Q1 defined by a MOSFET, and a current detecting resistor R is connected to both output terminals of a diode bridge B1 that rectifies an AC power supply voltage of an AC input power supply Vac1. A series circuit including a diode D1 and a smoothing capacitor C1 is connected to both ends of the switching element Q1, and a load RL is connected to both ends of the smoothing capacitor C1. The switching element Q1 is turned on/off under pulse width modulation (PWM) control by a control circuit 10. The current detecting resistor R detects an input current flowing through the diode bridge B1.

The control circuit 10 includes an error amplifier 111, a multiplier 112, an error amplifier 113, a voltage controlled oscillator (VCO) 115, and a PWM comparator 116.

The error amplifier 111 calculates an error between the voltage of the smoothing capacitor C1 and a reference voltage E1. The multiplier 112 multiplies an error voltage signal by a voltage rectified by the diode bridge B1. The error amplifier 113 generates an error between a multiplication result generated by the multiplier 112 and a current signal flowing through the diode bridge B1 and outputs the error to the PWM comparator 116.

The VCO 115 generates a triangular-wave signal of a frequency according to a voltage value of a rectified AC power supply voltage.

In the PWM comparator 116, a triangular-wave signal from the VCO 115 is input to a minus terminal, and a signal from the error amplifier 113 is input to a plus terminal. That is, the PWM comparator 116 applies a duty pulse according to a current flowing through the diode bridge B1 and an output voltage to the switching element Q1. This duty pulse is a pulse-width control signal that continuously compensates for fluctuations of an AC power supply voltage and a DC load voltage in constant cycles. With this configuration, control is performed so that the waveform of an AC power supply current matches the waveform of an AC power supply voltage, whereby the power factor is corrected.

On the other hand, a digitally-controlled PFC converter is disclosed in Japanese Unexamined Patent Application Publication No. 7-177746.

In the case of digital control, a current flowing through an inductor is detected, and switching is performed on a switching element under PWM control according to the current value.

As described above, in the PFC converter, it is necessary to detect a current flowing through an inductor (hereinafter "inductor current") in order to cause an input current waveform to be similar to an input voltage waveform. For this purpose, the following methods may be typically used.

(a) Directly detect a current flowing through an inductor.

(b) Detect a current flowing through a switching element and treat the current as being equivalent to an inductor current.

(c) Detect a current flowing through a diode provided on an output side and treat the current as being equivalent to an inductor current.

In addition, the following methods may be used to provide a current detecting means.

(1) Insert a current detecting resistor in series into a current path and detect a decreased voltage at both ends of the resistor.

(2) Insert a current transformer into a current path or perform detection using a current transformer in which an inductor is on the primary side.

(3) Provide a hole sensor in a current path and detect an output voltage thereof.

In the above-described method (1) of using a current detecting resistor, power consumption in the current detecting resistor itself is loss, which is a problem in terms of reducing loss. In the method (2) of using a current transformer, a DC component of a current that is to be detected is cut, and thus, only an AC component of the current is detected and the DC component of the current (DC offset) cannot be detected. If each of the currents in the above-described methods (b) and (c) is detected using a current transformer and signals are combined, an inductor current can be detected. However, in this case, two current transformers are required. In the method (3) of using a hole sensor, the problems that may occur in the methods (1) and (2) do not arise, but the overall cost increases because the sensor is expensive.

SUMMARY OF THE INVENTION

To overcome the problems described above, preferred embodiments of the present invention provide a low-cost PFC converter that accurately detects an inductor current including a DC component and appropriately corrects a power factor with low loss.

A PFC converter according to a preferred embodiment of the present invention preferably includes a rectifier circuit arranged to rectify an AC voltage input from an AC input power supply, a series circuit that is connected in a subsequent stage of the rectifier circuit and that includes an inductor and a switching element, a rectifying and smoothing circuit connected in parallel to the switching element, a switching control circuit arranged to perform on/off control of the switching element so that an average value of an input current input from the AC input power supply has a similar waveform with respect to the AC voltage, and an on-period current detecting circuit arranged to detect a current flowing through the switching element or the inductor during an on period of the switching element or an off-period current detecting circuit arranged to detect a current flowing through the inductor during an off period of the switching element. The PFC converter preferably has any of the following configurations.

The PFC converter preferably includes an input current detecting circuit arranged to detect, as an average value of the input current, a value that is obtained by sampling a current detection signal generated by the on-period current detecting circuit or the off-period current detecting circuit at the approximate middle of the on period or off period of the switching element.

The value obtained by sampling the detection signal of the current flowing through the switching element at the approximate middle of the on period of the switching element is an average value of an inductor current. Also, the value obtained by sampling the detection signal of the current flowing through the inductor at the approximate middle of the off period of the switching element is an average value of an inductor current. In any case, the average value of the current input to the PFC converter can preferably be detected substantially by using one-point sampling.

In a case in which a current value that is obtained by sampling a current detection signal generated by the on-period current detecting circuit or the off-period current detecting circuit at a start point of the on period or an end point of the off period of the switching element is represented by Is, an input voltage input from the AC input power supply is represented by Vi, an inductance value of the inductor is represented by L, the on period of the switching element is represented by Ton, the off period is represented by Toff, and an average value of a current flowing through the inductor is represented by ILav, a value that is preferably obtained by calculating $ILav=Is+(Vi/L)\times Ton/2$ or $ILav=Is+\{(Vo-Vi)/L\}\times Toff/2$ is detected as an average value of the input current.

Accordingly, the average value of the current input to the PFC converter is substantially detected.

In a case in which a current value that is obtained by sampling a current detection signal generated by the on-period current detecting circuit or the off-period current detecting circuit at an end point of the on period or a start point of the off period of the switching element is represented by Is, an input voltage input from the AC input power supply is represented by Vi, an output voltage is represented by Vo, an inductance value of the inductor is represented by L, the on period of the switching element is represented by Ton, the off period is represented by Toff, and an average value of a current flowing through the inductor is represented by ILav, a value that is preferably obtained by calculating $ILav=Is-(Vi/L)\times Ton/2$ or $ILav=Is-\{(Vo-Vi)/L\}\times Toff/2$ is detected as an average value of the input current.

Accordingly, the average value of the current input to the PFC converter can be substantially detected.

A PFC converter according to another preferred embodiment of the present invention preferably includes a first series circuit that is connected in parallel to a load and that includes a first switching element and a first rectifier element, an inductor that is connected between a connection point of the first switching element and the first rectifier element and a first input terminal of an AC input power supply, a second series circuit that is connected in parallel to the load, that includes a second switching element and a second rectifier element, and that includes a connection point of the second switching element and the second rectifier element, the connection point being connected to a second input terminal of the AC input power supply, a smoothing circuit connected in parallel to the load, a switching control circuit arranged to perform on/off control on the first and second switching elements so that an average value of an input current input from the AC input power supply has a similar waveform with respect to an AC voltage of the AC input power supply, and an on-period current detecting circuit arranged to detect a current flowing through the switching element or the inductor during an on period of the switching element or an off-period current detecting circuit arranged to detect a current flowing through the inductor during an off period of the switching element. The PFC converter of the second type preferably has any of the following configurations.

The PFC converter preferably includes an input current detecting circuit arranged to detect, as an average value of the input current, a value that is obtained by sampling a current detection signal generated by the on-period current detecting circuit or the off-period current detecting circuit at the approximate middle of the on period or off period of the first or second switching element.

The value obtained by sampling the detection signal of the current flowing through the first or second switching element at the approximate middle of the on period or off period of the first or second switching element is an average value of an inductor current. Thus, the average value of the current flowing through the inductor can preferably be detected substantially by using one-point sampling.

The PFC converter preferably includes an input current detecting circuit arranged to detect, as an average value of the input current, a value that is preferably obtained by calculating $ILav=Is+(Vi/L)\times Ton/2$ or $ILav=Is+\{(Vo-Vi)/L\}\times Toff/2$, in a case in which a current value that is obtained by sampling a current detection signal generated by the on-period current detecting circuit or the off-period current detecting circuit at a start point of the on period or an end point of the off period of the switching element is represented by Is, an input voltage input from the AC input power supply is represented by Vi, an inductance value of the inductor is represented by L, the on period of the switching element is represented by Ton, the off period is represented by Toff, and an average value of a current flowing through the inductor is represented by ILav.

Accordingly, the average value of the current input to the PFC converter can preferably be substantially detected.

The PFC converter preferably includes an input current detecting circuit arranged to detect, as an average value of the input current, a value that is preferably obtained by calculating $ILav=Is-(Vi/L)\times Ton/2$ or $ILav=Is-\{(Vo-Vi)/L\}\times Toff/2$, in a case in which a current value that is obtained by sampling a current detection signal generated by the on-period current detecting circuit or the off-period current detecting circuit at an end point of the on period or a start point of the off period of the switching element is represented by Is, an input voltage input from the AC input power supply is represented by Vi, an output voltage is represented by Vo, an inductance value of the inductor is represented by L, the on period of the switching element is represented by Ton, the off period is represented by Toff, and an average value of a current flowing through the inductor is represented by ILav.

Accordingly, the average value of the current input to the PFC converter can preferably be substantially detected.

The on-period current detecting circuit preferably includes a current detecting resistor that is connected in series to the switching element.

With this configuration, the average value of the current flowing through the switching element during the on period of the switching element (i.e., inductor current) can be obtained.

The on-period current detecting circuit preferably includes a current transformer that is connected in series to the first or second switching element, for example.

With this configuration, the average value of the current flowing through the inductor during the on period of the switching element can be obtained.

The off-period current detecting circuit preferably includes a current detecting resistor that is connected in series to a current path in which a current flows through the inductor during the off period of the switching element, for example.

With this configuration, the average value of the current flowing through the inductor during the off period of the switching element can be obtained.

The off-period current detecting circuit preferably includes a current transformer that is connected in series to a current path in which a current flows through the inductor during the off period of the switching element, for example.

With this configuration, the average value of the current flowing through the inductor during the off period of the switching element can be obtained.

In the PFC converter according to various preferred embodiments of the present invention, the cost is significantly reduced by using a current detecting resistor. In addition, since the current detecting resistor is used, an inductor current including a DC component can be detected, and a power factor can be appropriately corrected. Further, a current flows through the current detecting resistor only during any of the on period and off period of the switching element, and thus, the power loss caused by the current detecting resistor is reduced. Furthermore, when using a current transformer for current detection, only one current transformer is required and, thus, the cost and size are reduced. Furthermore, lower loss and simplification of the current detecting circuit are achieved.

The above and other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

A PFC converter according to a first preferred embodiment of the present invention will be described with reference to FIGS. 2 to 4.

Figure 1:
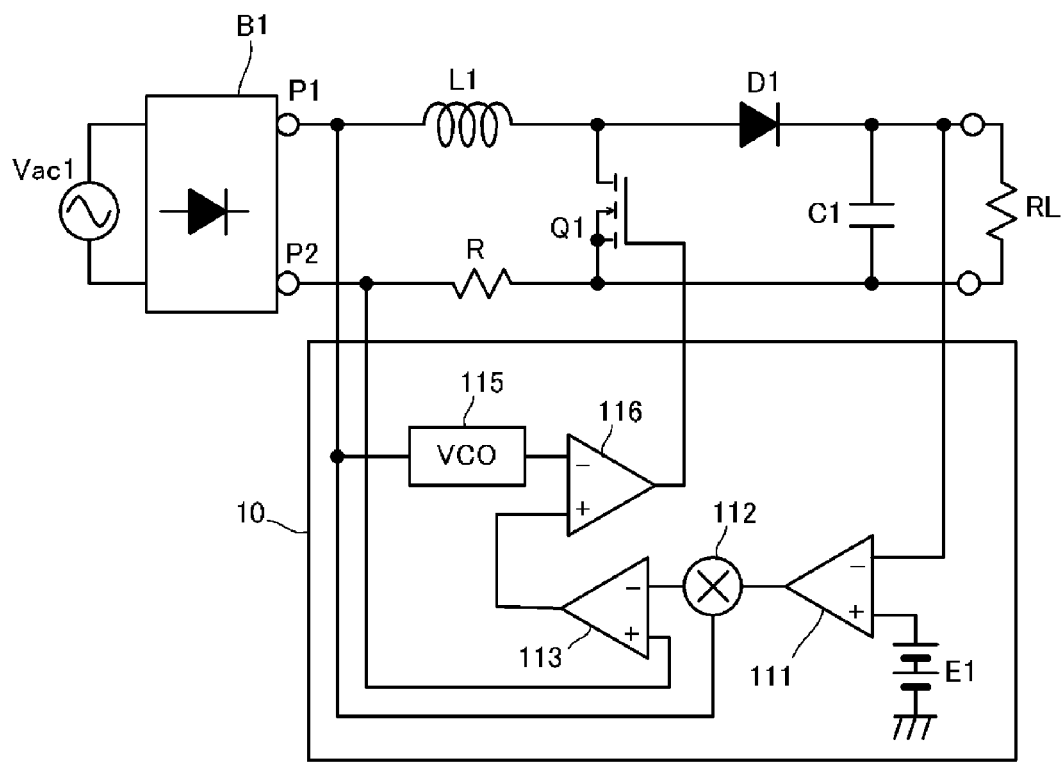
FIG. 1 is a circuit diagram of a known PFC converter described.
Figure 2:
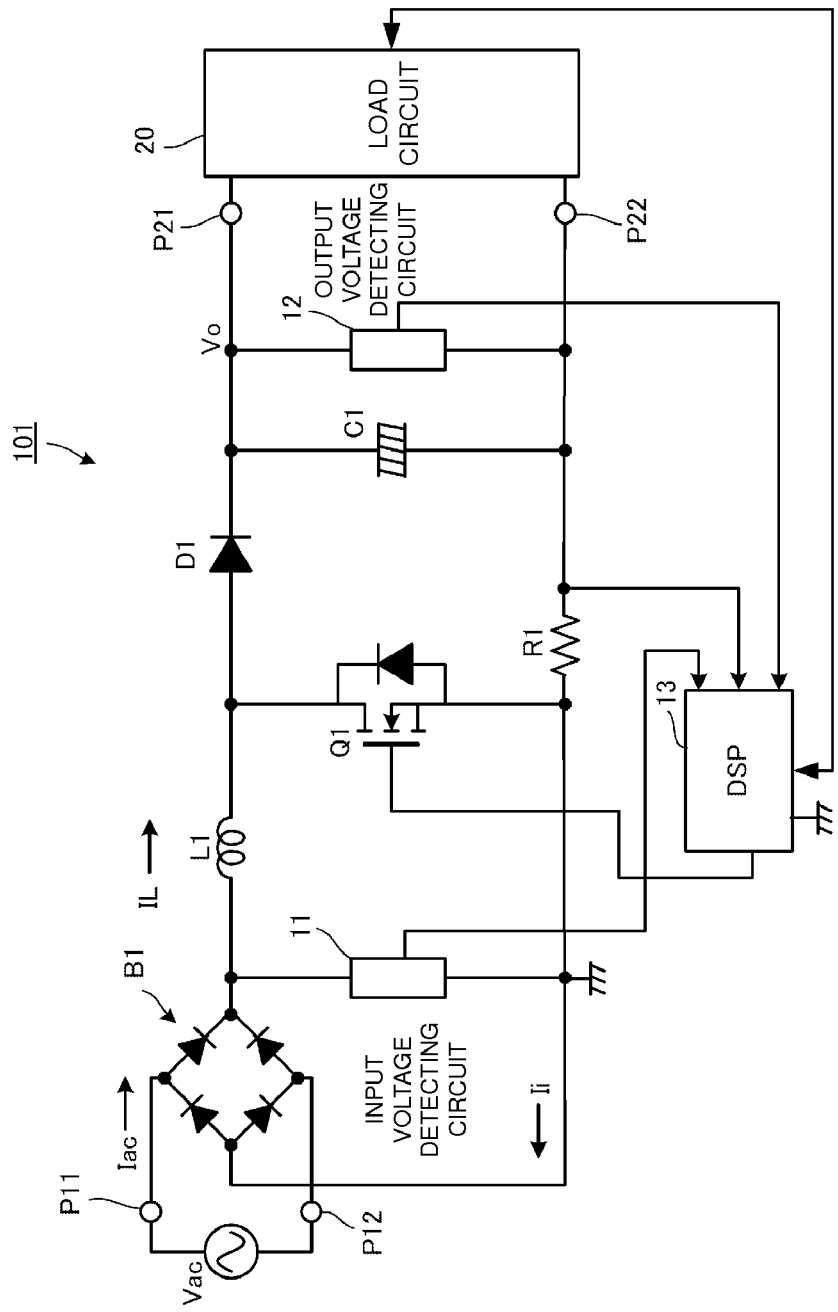
FIG. 2 is a circuit diagram of a PFC converter according to a first preferred embodiment of the present invention.

FIG. 2 is a circuit diagram of the PFC converter according to the first preferred embodiment. In FIG. 2, symbols P11 and P12 denote input ports of the PFC converter 101, and symbols P21 and P22 denote output ports of the PFC converter 101. An AC input power supply Vac, which is a commercial AC power supply, is input to the input ports P11 and P12, and a load circuit 20 is connected to the output ports P21 and P22.

The load circuit 20 is, for example, a circuit of a DC-DC converter and an electronic apparatus that is supplied with power by the DC-DC converter.

In an input stage of the PFC converter 101, a diode bridge B1 that performs full-wave rectification on an AC voltage of the AC input power supply Vac is preferably provided. On the output side of the diode bridge B1, a series circuit including an inductor L1, a switching element Q1, and a current detecting resistor R1 is connected. A rectifying and smoothing circuit including a diode D1 and a smoothing capacitor C1 is connected in parallel to both ends of the switching element Q1. The inductor L1, the switching element Q1, the diode D1, and the smoothing capacitor C1 define a step-up chopper circuit.

An input voltage detecting circuit 11 is provided between both ends on the output side of the diode bridge B1. Also, an output voltage detecting circuit 12 is provided between the output ports P21 and P22. A digital signal processing circuit 13 is preferably defined by a digital signal processor (DSP) and controls the PFC converter 101 through digital signal processing. That is, the digital signal processing circuit 13 receives an output signal of the input voltage detecting circuit 11 and detects the phase of the voltage of the AC input power supply using the method described below. In addition, the digital signal processing circuit 13 receives an output signal of the output voltage detecting circuit 12 and detects an output voltage. Further, the digital signal processing circuit 13 turns on/off the switching element Q1 at a predetermined switching frequency.

Furthermore, the digital signal processing circuit 13 preferably includes a port arranged to communicate with the load circuit 20 and to perform data communication or input/output of signals, thereby constantly transmitting a status of the converter to the load circuit (electronic apparatus), transmitting an input voltage, an output voltage, and an output current, for example, and receiving a load status from the load circuit side to reflect it in switching control.

Figure 3A:
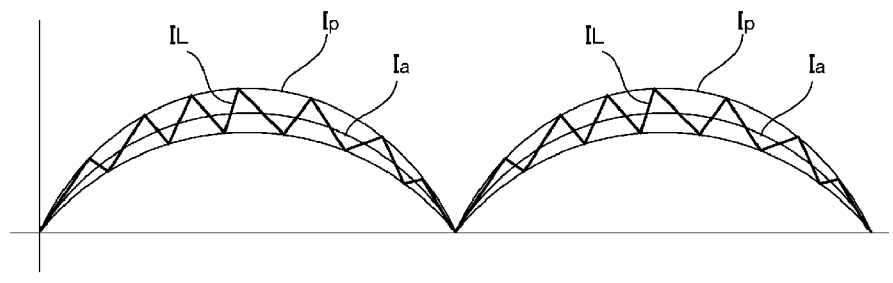
FIGS. 3A to 3C include diagrams illustrating various methods for controlling a PFC converter by a digital signal processing circuit.
Figure 3B:
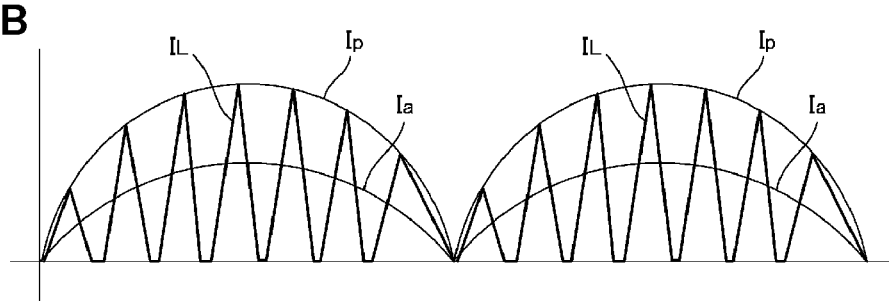
Figure 3C:
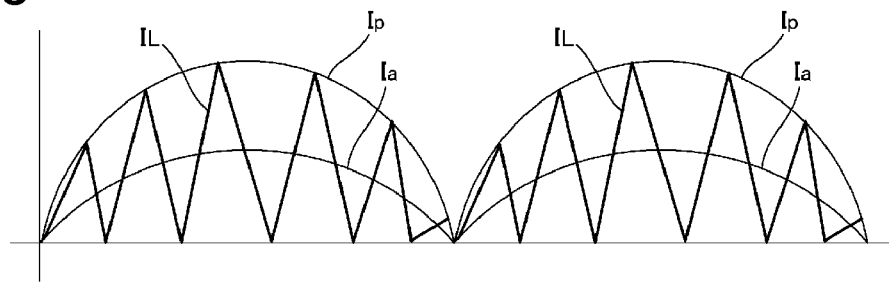

FIGS. 3A to 3C include diagrams illustrating various methods for controlling the PFC converter 101 used by the digital signal processing circuit 13. Each of FIGS. 3A to 3C illustrates a current waveform in one cycle of the AC input power supply. Here, a waveform IL is the waveform of a current flowing through the inductor L1 in the PFC converter 101 illustrated in FIG. 2. Ip denotes an envelope of the peak values (peak current) thereof, and Ia denotes an envelope of the average values (average current). Note that, for convenience of illustration, FIGS. 3A to 3C illustrate a case in which the switching frequency of the PFC converter 101 is extremely low, that is, a frequency at which the waveform of a current flowing through the inductor L1 is shown as a triangular waveform.

FIG. 3A is a waveform diagram in a current continuous mode, FIG. 3B is a waveform diagram in a current discontinuous mode, and FIG. 3C is a waveform diagram in a current critical mode. As can be seen, in the current continuous mode illustrated in FIG. 3A, the current flowing through the inductor L1 of the PFC converter 101 is not zero except at the vicinity of a zero crossing point of the AC input power supply. In the current discontinuous mode illustrated in FIG. 3B a period in which the current value becomes zero occurs every time excitation energy is accumulated in/emitted from the inductor L1 of the PFC converter 101. In the critical mode illustrated in FIG. 3C, the current value becomes zero every time excitation energy is accumulated in/emitted from the inductor L1, and a state in which the current value is zero does not continue.

In the first preferred embodiment, the digital signal processing circuit 13 preferably performs control in the current continuous mode illustrated in FIG. 3A or in the current critical mode illustrated in FIG. 3C.

Figure 4A:
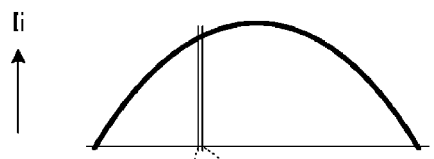
FIGS. 4A to 4C includes waveform diagrams of a voltage and current of the PFC converter 101 in the unit of a switching cycle in a state in which control is performed in a current continuous mode.
Figure 4B:
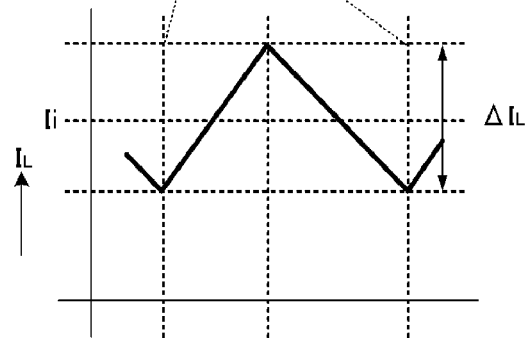
Figure 4C:
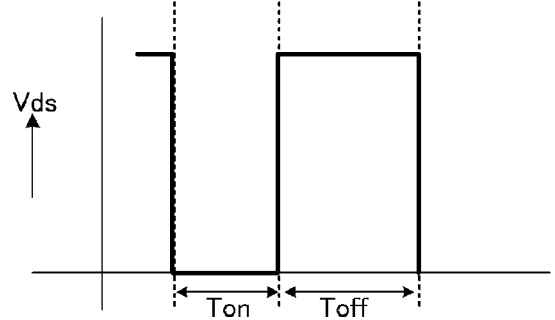

FIGS. 4A to 4C include waveform diagrams of a voltage and current of the PFC converter 101 in the unit of a switching cycle in a state in which control is performed in the current continuous mode.

The digital signal processing circuit 13 preferably performs switching control so that a current input to the PFC converter 101, that is, an average value of the current flowing through the inductor L1, has a waveform similar to a full-wave rectification waveform. In this manner, an input current of which the waveform is similar to that of an input voltage flows, so that harmonics are prevented and the power factor is corrected.

FIG. 4A is a current waveform of an average value Ii of a current flowing through the inductor L1 in the unit of a half cycle of a commercial power supply frequency, FIG. 4B is an enlargement of a portion of the time axis in the waveform in FIG. 4A, that is, a waveform diagram of a current IL flowing through the inductor L1 in the unit of a switching cycle, and FIG. 4C is a waveform diagram of a drain-source voltage Vds of the switching element Q1.

During an on period Ton of the switching element Q1, the current IL flows through the inductor L1, and the current IL increases with a slope determined in accordance with a voltage between both ends of the inductor L1 and the inductance of the inductor L1. After that, during an off period Toff of the switching element Q1, the current IL decreases with a slope determined in accordance with a voltage between both ends of the inductor L1 and the inductance thereof. In this manner, the current IL flowing through the inductor L1 fluctuates in the switching cycle within the width of a current ripple $\Delta IL$.

Figure 5:
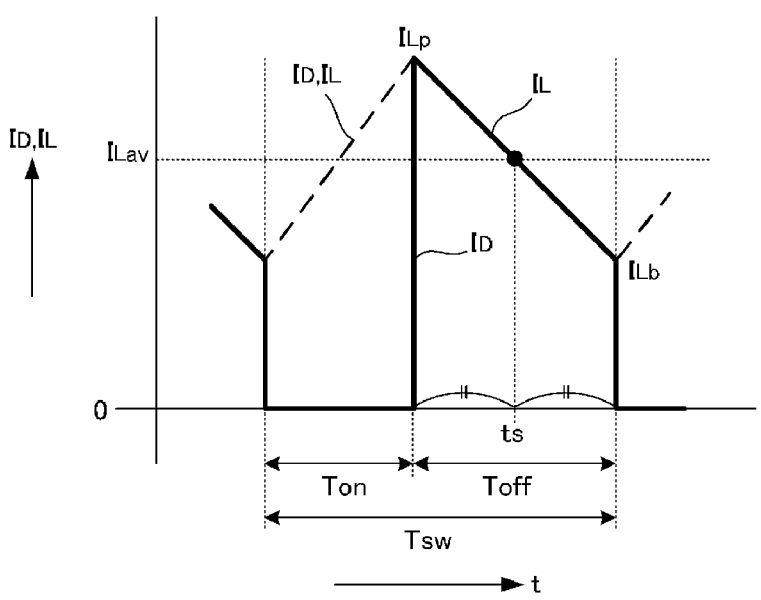
FIG. 5 is a diagram illustrating a method for obtaining an average value of a current flowing through an inductor L1 in order to perform average current control in the current continuous mode.

FIG. 5 is a diagram illustrating a method for obtaining an average value of the current flowing through the inductor L1 in order to perform average current control in the current continuous mode.

The value of a current flowing through the inductor L1 at a turn-off timing of the switching element Q1 (peak value) is represented by ILp, and the value of a current flowing through the inductor L1 at a turn-on timing of the switching element Q1 (minimum value) is represented by ILb. In this case, an average value of the current (average current) flowing through the inductor L1 during the off period Toff of the switching element Q1 is preferably represented by the following relationship.

$$ILav = (ILp + ILb)/2 \qquad (1)$$

On the other hand, the current flowing through the inductor L1 linearly decreases during the off period Toff of the switching element Q1, and thus, the current value of the inductor L1 at an approximate middle timing of the off period Toff of the switching element Q1 is substantially equal to the foregoing average current ILav.

Then, a decreased voltage of the resistor R1 at the approximate middle timing of the off period Toff of the switching element Q1 is subjected to sampling. This sampling value is a value that is proportional to the average current ILav of the current flowing through the inductor L1 during the off period Toff of the switching element Q1. A switching control signal that is provided to the gate of the switching element Q1 is generated by the digital signal processing circuit 13, and thus the approximate middle timing of the off period Toff is recognized and managed by the digital signal processing circuit 13. Therefore, a decreased voltage of the current detecting resistor R1 can be subjected to sampling at the approximate middle timing of the off period Toff without inputting a timing signal from the outside, for example.

Second Preferred Embodiment

Figure 6:
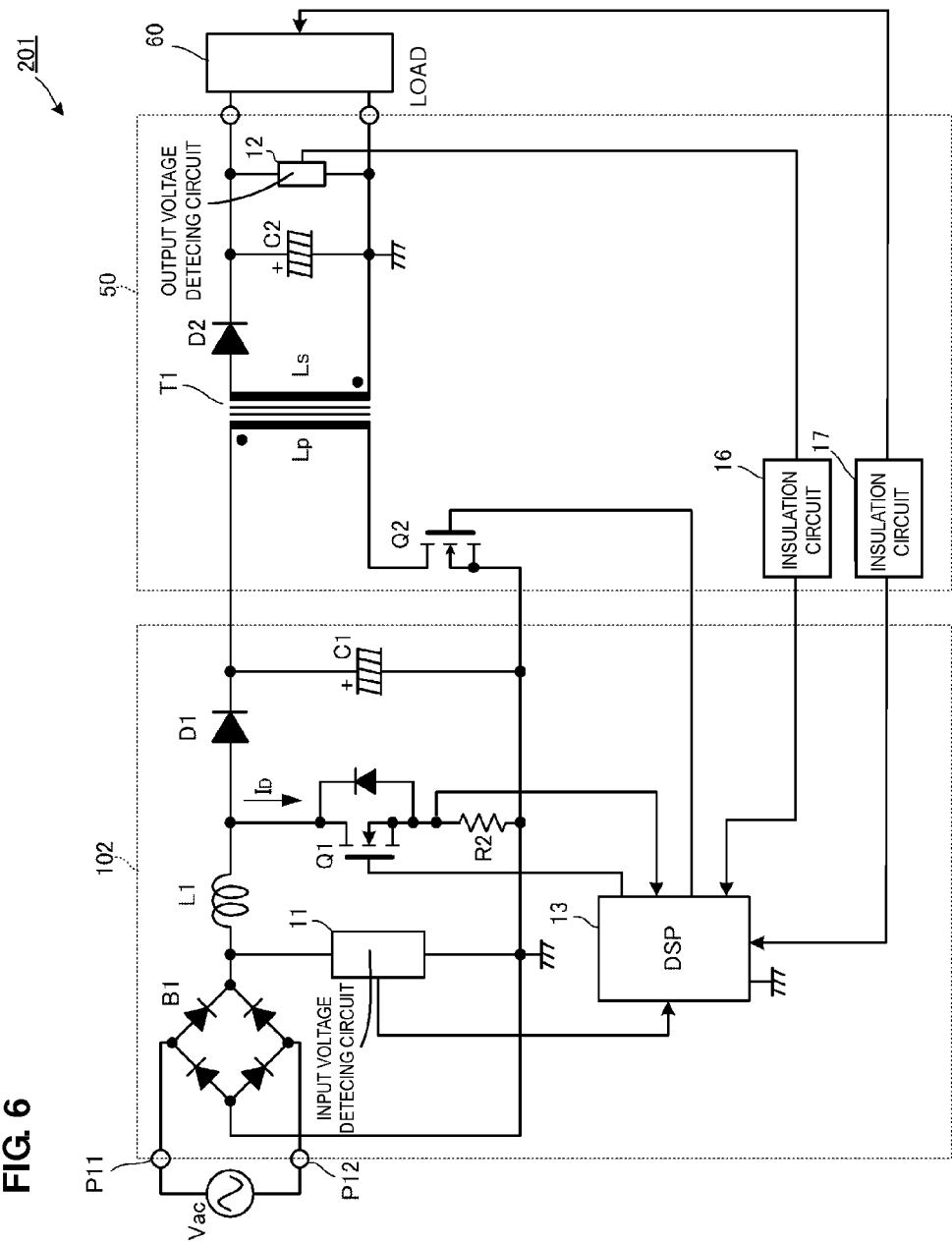
FIG. 6 is a circuit diagram of a switching power supply device according to a second preferred embodiment of the present invention.

FIG. 6 is a circuit diagram of a switching power supply device 201 according to a second preferred embodiment of the present invention.

In FIG. 6, the switching power supply device 201 preferably includes a PFC converter 102 and a DC-DC converter 50. A load 60 is connected to the output of the DC-DC-converter 50.

An AC input power supply Vac, which is a commercial AC power supply, is input to input ports P11 and P12 of the PFC converter 102, and the DC-DC converter 50 is connected to the output portion. The PFC converter 102 preferably includes a diode bridge B1 arranged to perform full-wave rectification on the AC input power supply Vac, an inductor L1 connected to the output of the diode bridge B1, a switching element Q1, a diode D1, and a smoothing capacitor C1. The inductor L1, the switching element Q1, the diode D1, and the smoothing capacitor C1 define a step-up chopper circuit.

In contrast to the first preferred embodiment illustrated in FIG. 2, in the second preferred embodiment, a current detecting resistor R2 is preferably connected in series to the source side of the switching element Q1.

The DC-DC converter 50 preferably includes a rectifying and smoothing circuit including a transformer T1, a switching element Q2 connected in series to a primary coil Lp of the transformer T1, and a diode D2 and capacitor C2 connected to a secondary coil Ls of the transformer T1.

In addition, a digital signal processing circuit provided on the primary side of the transformer T1 preferably not only outputs a switching control signal to the switching element Q1 of the PFC converter 102, but also outputs a switching control signal to the switching element Q2 of the DC-DC converter 50. Also, the digital signal processing circuit 13 receives a detection signal from an output voltage detecting circuit 12 via an insulation circuit 16, thereby detecting an output voltage. Then, the digital signal processing circuit 13 controls the on-duty ratio of the switching element Q2, thereby stabilizing an output voltage of the DC-DC converter 50.

Furthermore, the digital signal processing circuit receives a detection voltage of an input voltage detecting circuit 11 of the PFC converter 102, a detection signal of the output voltage detecting circuit 12, and a decreased voltage of the current detecting resistor R2, and accordingly, supplies a switching control signal for an on period and an off period to the gate of the switching element Q1. That is, the digital signal processing circuit 13 controls the switching element Q1 so that a current input to the PFC converter 102 has a waveform similar to that of an input voltage. Also, the digital signal processing circuit 13 communicates with the load 60 via an insulation circuit 17, thereby transmitting a status of the PFC converter 102 and the DC-DC converter 50 to the load 60 or receiving a load status from the load 60 to reflect it in switching control.

Figure 7:
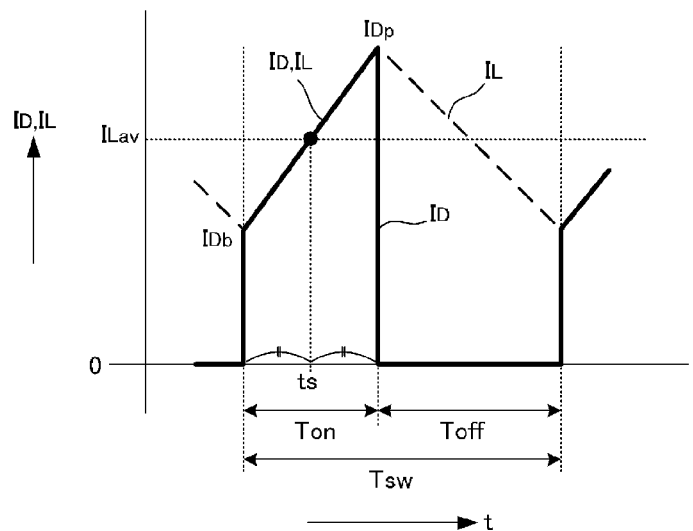
FIG. 7 is a diagram illustrating a method for obtaining an average value of a current flowing through an inductor in order to perform average current control in the current continuous mode.

FIG. 7 is a diagram illustrating a method for obtaining an average value of a current flowing through the inductor L1 in order to perform average current control in the current continuous mode.

A drain current flowing through the switching element Q1 at a turn-on timing of the switching element Q1 is represented by IDb, and the value of a current flowing through the switching element Q1 just before a turn-off timing of the switching element Q1 (peak value) is represented by IDp. In this case, an average value of the current flowing through the switching element Q1 during an on period Ton of the switching element Q1, that is, the current flowing through the inductor L1 (average current), is preferably represented by the following relationship.

$$ILav = (IDp + IDb)/2 \quad (2)$$

On the other hand, the current flowing through the inductor L1 linearly increases during the on period Ton of the switching element Q1, and thus, the current value of the switching element Q1 at the approximate middle timing of the on period Ton of the switching element Q1 is substantially equal to the average current ILav.

Then, a decreased voltage of the current detecting resistor R2 at the approximate middle timing of the on period Ton of the switching element Q1 is preferably subjected to sampling. This sampling value is a value that is proportional to the average current ILav of the current flowing through the inductor L1 during the on period Ton of the switching element Q1. A switching control signal that is provided to the gate of the switching element Q1 is generated by the digital signal processing circuit 13, and thus, the approximate middle timing of the on period Ton is preferably recognized and managed by the digital signal processing circuit 13. Therefore, a decreased voltage of the resistor R2 is subjected to sampling at the approximate middle timing of the on period Ton without inputting a timing signal from the outside, for example.

Third Preferred Embodiment

Figure 8:
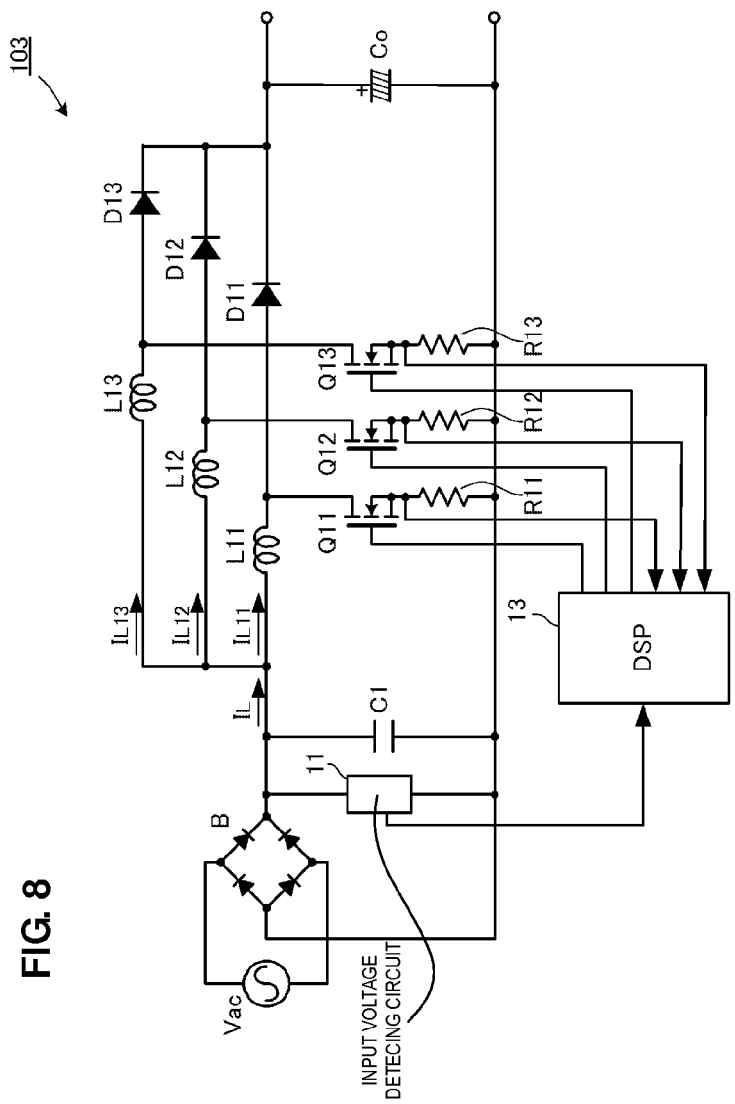
FIG. 8 is a circuit diagram of a PFC converter according to a third preferred embodiment of the present invention.
Figure 9:
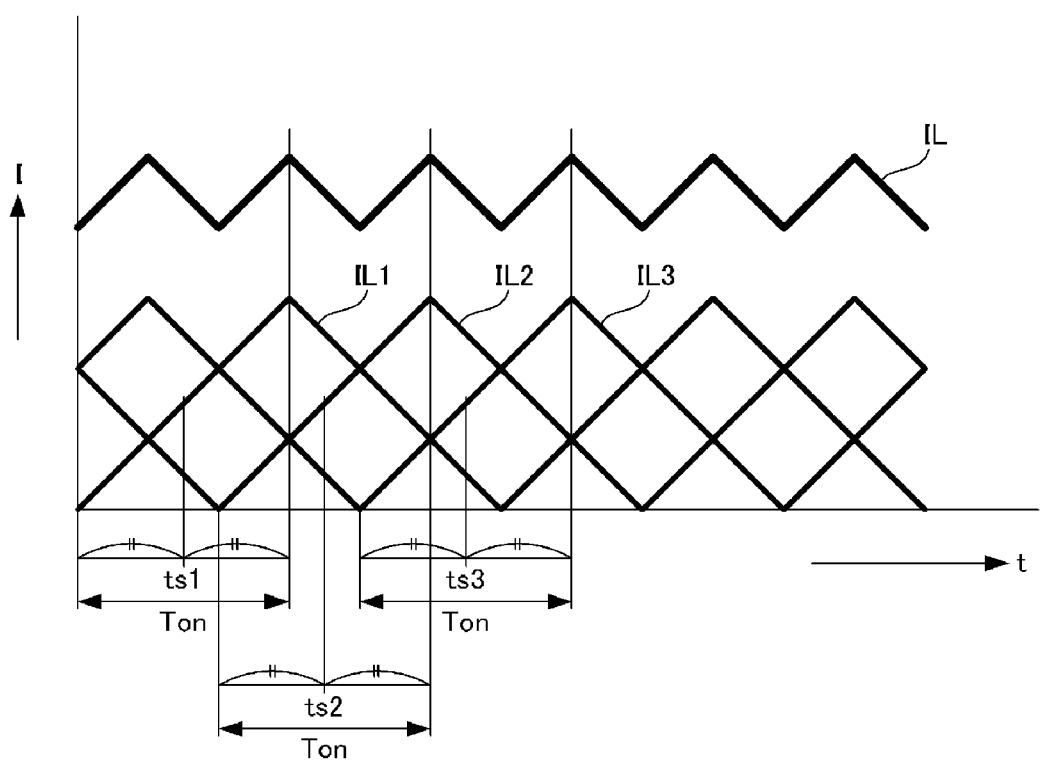
FIG. 9 is a waveform diagram of individual portions of the PFC converter.

FIG. 8 is a circuit diagram of a PFC converter 103 according to a third preferred embodiment of the present invention. FIG. 9 is a waveform diagram of individual portions of the PFC converter 103.

The PFC converter 103 preferably includes three inductors L11, L12, and L13, three diodes D11, D12, and D13, and three switching elements Q11, Q12 and Q13, thereby defining a three-phase PFC converter. A digital signal processing circuit 13 detects an input voltage using an input voltage detecting circuit 11, receives decreased voltages from current detecting resistors R11, R12, and R13, and supplies switching control signals to the switching elements Q11, Q12, and Q13, respectively.

FIG. 9 is a waveform diagram of inductor currents IL11, IL12, and IL13 flowing through the three inductors L11, L12, and L13 of the PFC converter 103 illustrated in FIG. 8, and an input current IL. By sequentially turning on/off the three switching elements Q11, Q12, and Q13 with a phase difference of 120 degrees, electrical stresses of an input capacitor C1 and an output capacitor C0 are alleviated and noise is reduced. In addition, energy (heat) is dispersed, so that the size and height of components can be decreased.

In order to disperse the energy (heat), it is preferable that the inductor currents IL11, IL12, and IL13 flowing through the three inductors L11, L12, and L13 are even, and it is necessary to accurately detect the individual inductor currents. In the third preferred embodiment, as illustrated in FIG. 9, the digital signal processing circuit 13 preferably performs sampling at the approximate middle timing of an on period at which currents flow through the three switching elements Q11, Q12, and Q13, thereby accurately detecting the average values of the inductor currents of the three inductors.

Specifically, the digital signal processing circuit 13 samples the decreased voltage of the current detecting resistor R11 at an approximate middle timing ts1 of the on period of the switching element Q11, thereby obtaining the average value of the current IL11 flowing through the inductor L11. Also, the digital signal processing circuit 13 samples the decreased voltage of the current detecting resistor R12 at an approximate middle timing ts2 of the on period of the switching element Q12, thereby obtaining the average value of the current IL12 flowing through the inductor L12. Also, the digital signal processing circuit 13 samples the decreased voltage of the current detecting resistor R13 at an approximate middle timing ts3 of the on period of the switching element Q13, thereby obtaining the average value of the current IL13 flowing through the inductor L13.

Fourth Preferred Embodiment

Figure 10:
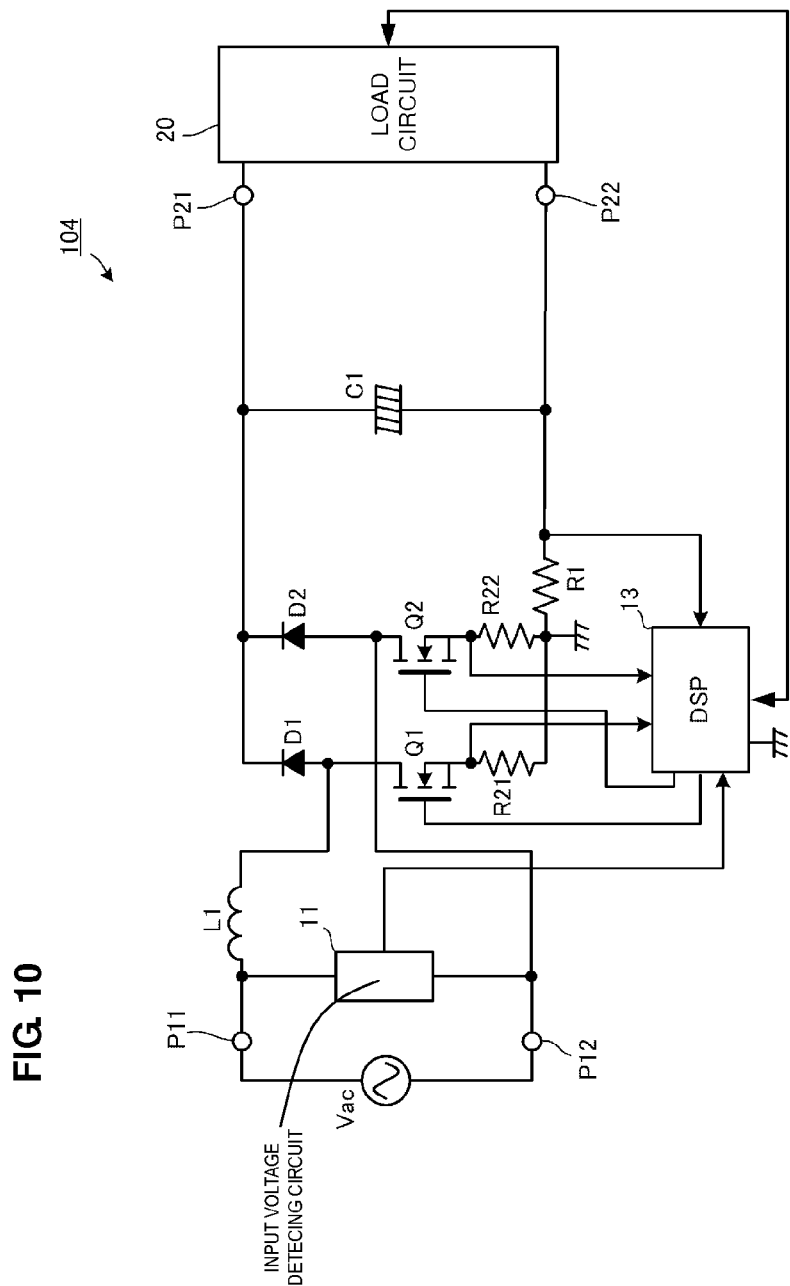
FIG. 10 is a circuit diagram of a PFC converter according to a fourth preferred embodiment of the present invention.

FIG. 10 is a circuit diagram of a PFC converter 104 according to a fourth preferred embodiment. FIG. 11 includes diagrams illustrating current paths of the PFC converter 104 at four timings.

The PFC converter 104 illustrated in FIG. 10 preferably is a diode-bridgeless PFC converter in which an inductor and two switching elements are provided without via a diode bridge, for example.

In FIG. 10, symbols P11 and P12 denote input ports of the PFC converter 104, and symbols P21 and P22 denote output ports of the PFC converter 104. An AC input power supply Vac, which is a commercial AC power supply, is input to the input ports P11 and P12, and a load circuit 20 is connected to the output ports P21 and P22.

The load circuit 20 includes, for example, a circuit of a DC-DC converter and an electronic apparatus that is supplied with power by the DC-DC converter.

In an input stage of the PFC converter 104, preferably, an input voltage detecting circuit 11 is provided, and an inductor L1 is connected in series to one of the lines thereof. In the subsequent stage of the inductor L1, a bridge circuit including diodes D1 and D2 and switching elements Q1 and Q2 is connected. Current detecting resistors R21 and R22 are connected between the sources of the switching elements Q1 and Q2 and a ground. A smoothing circuit including a smoothing capacitor C1 is preferably connected in parallel to the output of the bridge circuit.

Figure 11A:
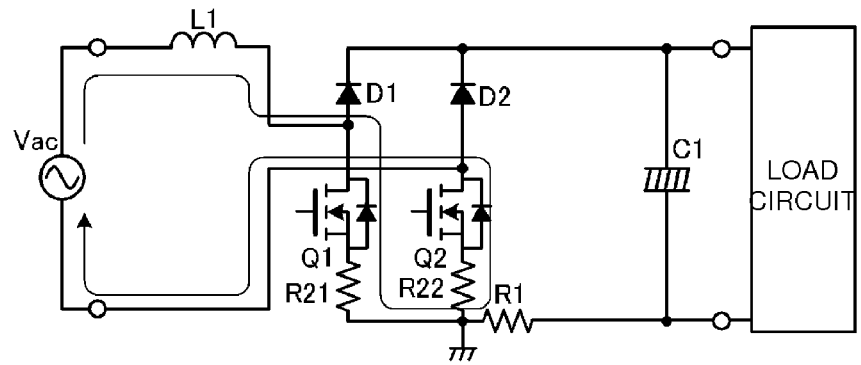
FIGS. 11A to 11D include diagrams illustrating current paths of the PFC converter at four timings.
Figure 11B:
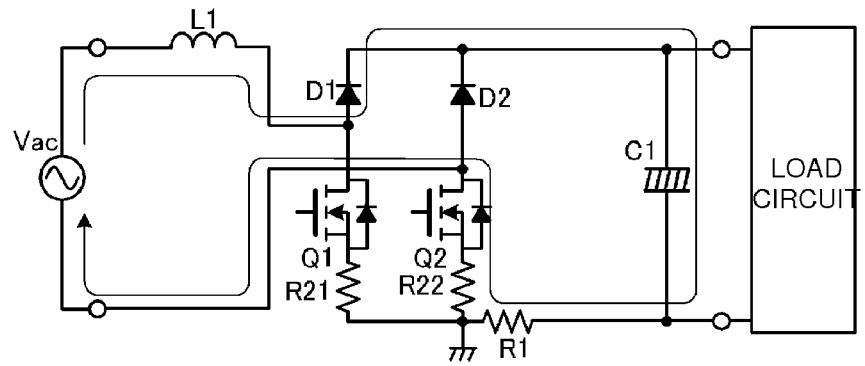

FIG. 11A illustrates a current path when both of the switching elements Q1 and Q2 are in an on state in a positive half cycle of the AC input power supply, and FIG. 11B illustrates a current path when both of the switching elements Q1 and Q2 are in an off state in a positive half cycle of the AC input power supply.

Figure 11C:
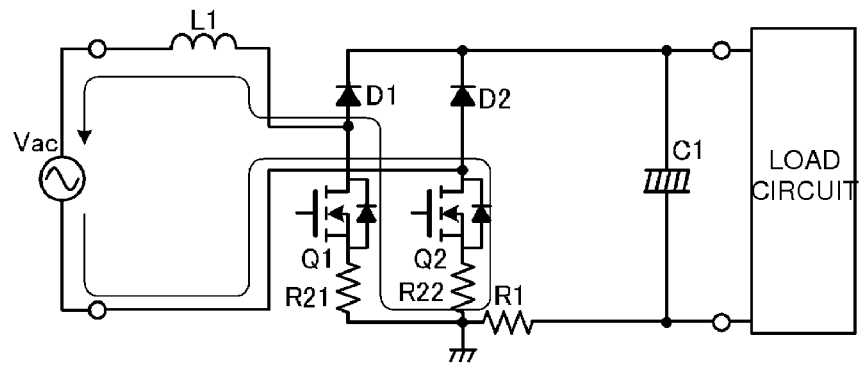
Figure 11D:
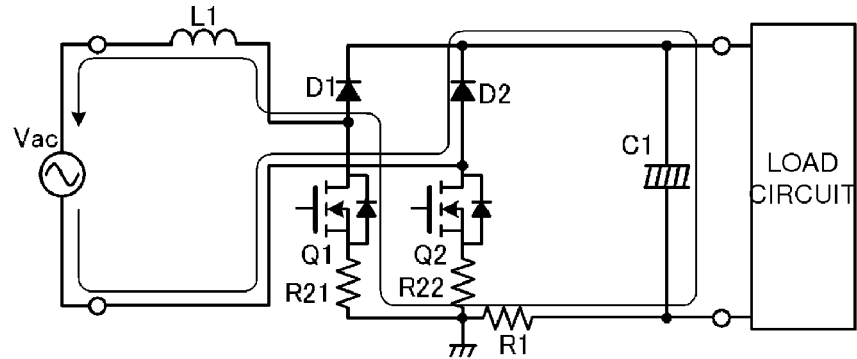

FIG. 11C illustrates a current path when both of the switching elements Q1 and Q2 are in an on state in a negative half cycle of the AC input power supply, and FIG. 11D illustrates a current path when both of the switching elements Q1 and Q2 are in an off state in a negative half cycle of the AC input power supply.

In a positive half cycle of the AC input power supply, a current flows through the path illustrated in FIG. 11A and excitation energy is accumulated in the inductor L1 when the switching elements Q1 and Q2 are in an on state, whereas a current flows through the path illustrated in FIG. 11B and excitation energy is emitted from the inductor L1 when the switching elements Q1 and Q2 are in an off state. At this time, a current flows via a parasitic diode of the switching element Q2. Likewise, in a negative half cycle of the AC input power supply, a current flows through the path illustrated in FIG. 11C and excitation energy is accumulated in the inductor L1 when the switching elements Q1 and Q2 are in an on state, whereas excitation energy is emitted from the inductor L1 at the timing illustrated in FIG. 11D when the switching elements Q1 and Q2 are in an off state. At this time, a current flows via a parasitic diode of the switching element Q1.

Preferably, the current detecting resistor R21 is provided to detect the current flowing through the inductor L1 during an on period of the switching element Q1 in a positive half cycle of the AC input power supply. Also, preferably, the current detecting resistor R22 is provided to detect the current flowing through the inductor L1 during an on period of the switching element Q2 in a negative half cycle of the AC input power supply. The digital signal processing circuit 13 illustrated in FIG. 10 samples the decreased voltage of the current detecting resistors R21 and R22 at the approximate middle of the on period of the switching elements Q1 and Q2, thereby detecting the average value of the current flowing through the inductor L1.

Also, preferably the current detecting resistor R1 is provided to detect the current flowing through the inductor L1 during an off period of the switching elements Q1 and Q2. The digital signal processing circuit 13 samples the decreased voltage of the current detecting resistor R1 at the approximate middle of the off period of the switching elements Q1 and Q2, thereby detecting the average value of the current flowing through the inductor L1.

In the positive half cycle of the AC input power supply, the average value of the current flowing through the inductor L1 can be detected by sampling the decreased voltage of the current detecting resistor R22 at the approximate middle of the off period of the switching elements Q1 and Q2. Likewise, in the negative half cycle of the AC input power supply, the average value of the current flowing through the inductor L1 can be detected by sampling the decreased voltage of the current detecting resistor R21 at the approximate middle of the off period of the switching elements Q1 and Q2. Therefore, in this case, the current detecting resistor R1 is not required, and the power loss in the current detecting resistor R1 is reduced.

In the example illustrated in FIGS. 10 to 11D, the inductor L1 is preferably connected between a connection point of the diode D1 and the switching element Q1 and the input port P11 of the AC input power supply. Alternatively, an inductor may also be connected between a connection point of the diode D2 and the switching element Q2 and the input port P12 of the AC input power supply.

Fifth Preferred Embodiment

In a fifth preferred embodiment of the present invention, a current flowing through a switching element is preferably detected at the start point of an on period or at the end point of an off period of the switching element, thereby detecting an average value of a current input to a PFC converter.

The circuit configuration can be applied to the configuration of the PFC converter 102 illustrated in FIG. 6 according to the second preferred embodiment. Here, a description will be given of a process executed by the digital signal processing circuit 13 in the PFC converter 102 illustrated in FIG. 6 with reference to FIG. 6.

Figure 12:
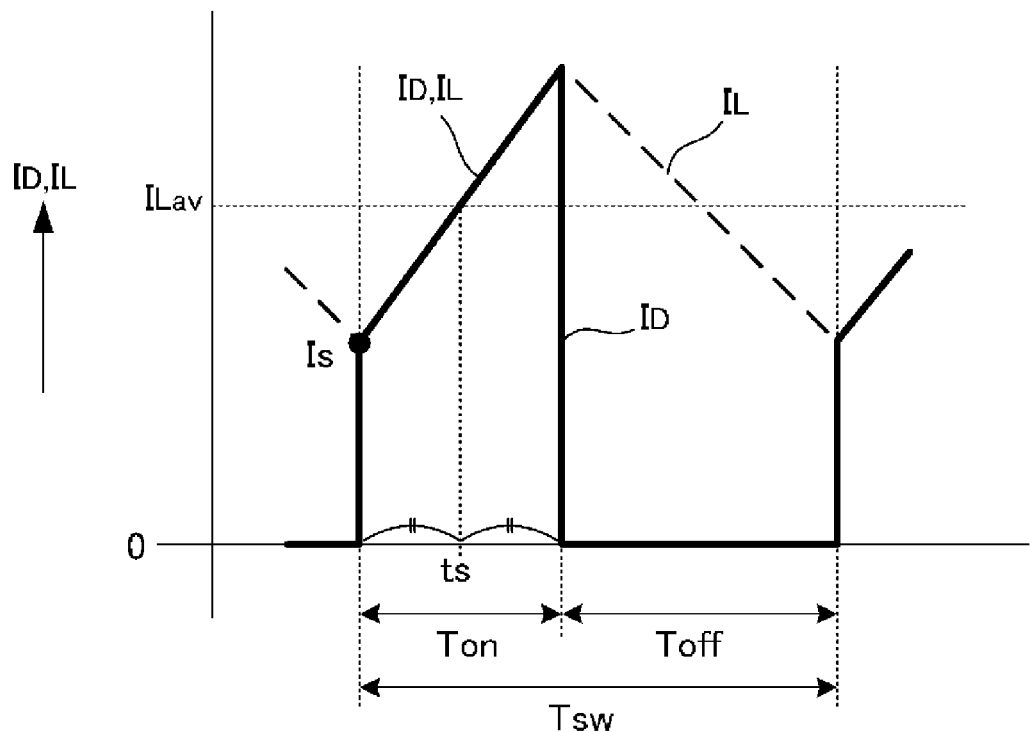
FIG. 12 is a diagram illustrating a method for obtaining an average value of a current flowing through a switching element in a PFC converter according to a fifth preferred embodiment of the present invention.

FIG. 12 is a diagram illustrating a method for obtaining an average value of a current input to the PFC converter 102 in order to perform average current control in the current continuous mode.

The value of a drain current flowing through the switching element Q1 at the start point of an on period of the switching element Q1 is represented by Is, an input voltage input from the AC input power supply is represented by Vi, the inductance value of the inductor L1 is represented by L, the on period of the switching element Q1 is represented by Ton, and an average value of the current flowing through the inductor L1 is represented by ILav.

In this case, the slope of change in the current flowing through the inductor L1 during the on period of the switching element Q1 is represented by Vi/L. Thus, the average value of the current input to the PFC converter 102 is preferably obtained by calculating $$ILav = Is + (Vi/L) \times Ton/2,$$

by sampling the current Is flowing through the switching element or inductor just after the turn-on of the switching element Q1.

The inductance value L is known at the time of shipment. Ton is recognized and managed by the digital signal processing circuit 13, as described above. Vi is originally detected to form a sinusoidal wave of a current. Normally, division imposes a large processing load on the digital signal processing circuit. However, for division based on the exponentiation of two, processing can be performed at high speed as in a product-sum operation by using bit shift. For the above-described reasons, this method enables execution of a calculation without adding a circuit or increasing a processing load.

Sixth Preferred Embodiment

In a sixth preferred embodiment of the present invention, a current flowing through an inductor is preferably detected at the start point of an on period or at the end point of an off period of a switching element, thereby detecting an average value of a current input to a PFC converter.

The circuit configuration can be applied to the configuration of the PFC converter 101 illustrated in FIG. 2 according to the first preferred embodiment. Here, a description will be given of a process executed by the digital signal processing circuit 13 in the PFC converter 101 illustrated in FIG. 2 with reference to FIG. 2.

Figure 13:
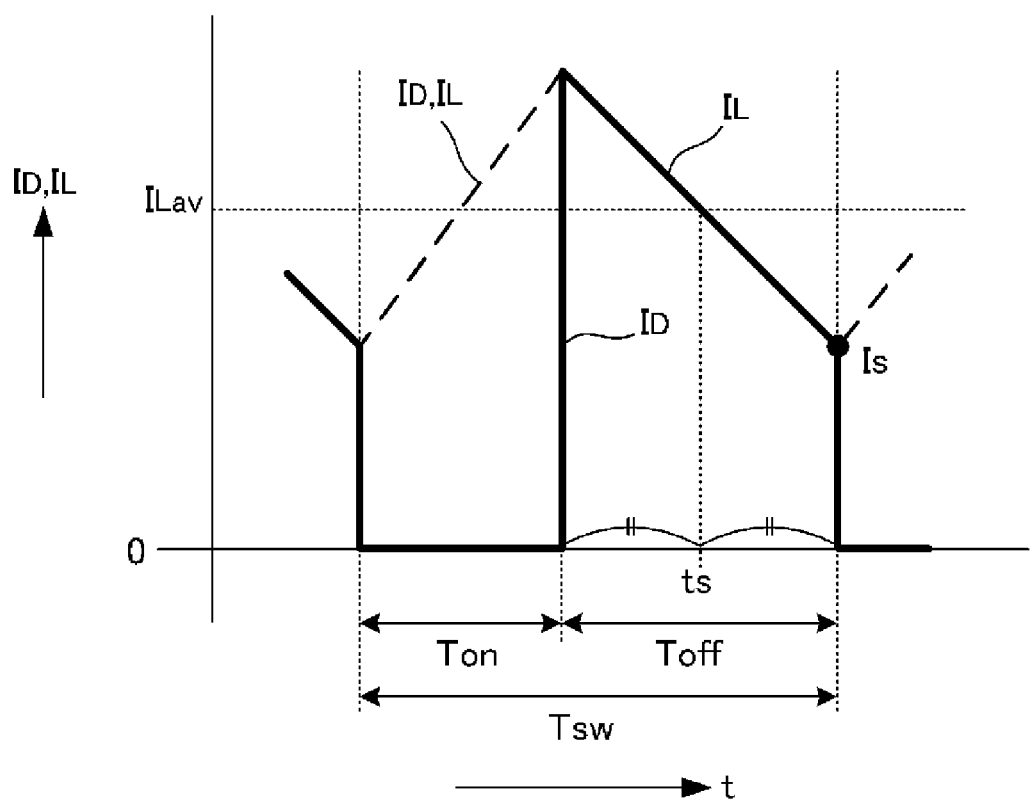
FIG. 13 is a diagram illustrating a method for obtaining an average value of a current flowing through an inductor in a PFC converter according to a sixth preferred embodiment of the present invention.

FIG. 13 is a diagram illustrating a method for obtaining an average value of a current input to the PFC converter 101 in order to perform average current control in the current continuous mode.

The value of an inductor current flowing through the inductor L1 at the end point of an off period of the switching element Q1 is represented by Is, an input voltage input from the AC input power supply is represented by Vi, the inductance value of the inductor L1 is represented by L, the off period of the switching element Q1 is represented by Toff, and an average value of the current flowing through the inductor L1 is represented by ILav.

In this case, the slope of change in the current flowing through the inductor L1 during the off period of the switching element Q1 is represented by −(Vo−Vi)/L.

Thus, the average value of the current input to the PFC converter 101 is preferably obtained by calculating $$ILav = Is + \{(Vo - Vi)/L\} \times Toff/2,$$

by sampling the current Is flowing through the inductor just before the turn-on of the switching element Q1.

Seventh Preferred Embodiment

In a seventh preferred embodiment of the present invention, a current flowing through a switching element is detected at the end point of an on period or at the start point of an off period of the switching element, thereby detecting an average value of a current input to a PFC converter.

The circuit configuration can be applied to the configuration of the PFC converter 102 illustrated in FIG. 6 according to the second preferred embodiment. Here, a description will be given of a process executed by the digital signal processing circuit 13 in the PFC converter 102 illustrated in FIG. 6 with reference to FIG. 6.

Figure 14:
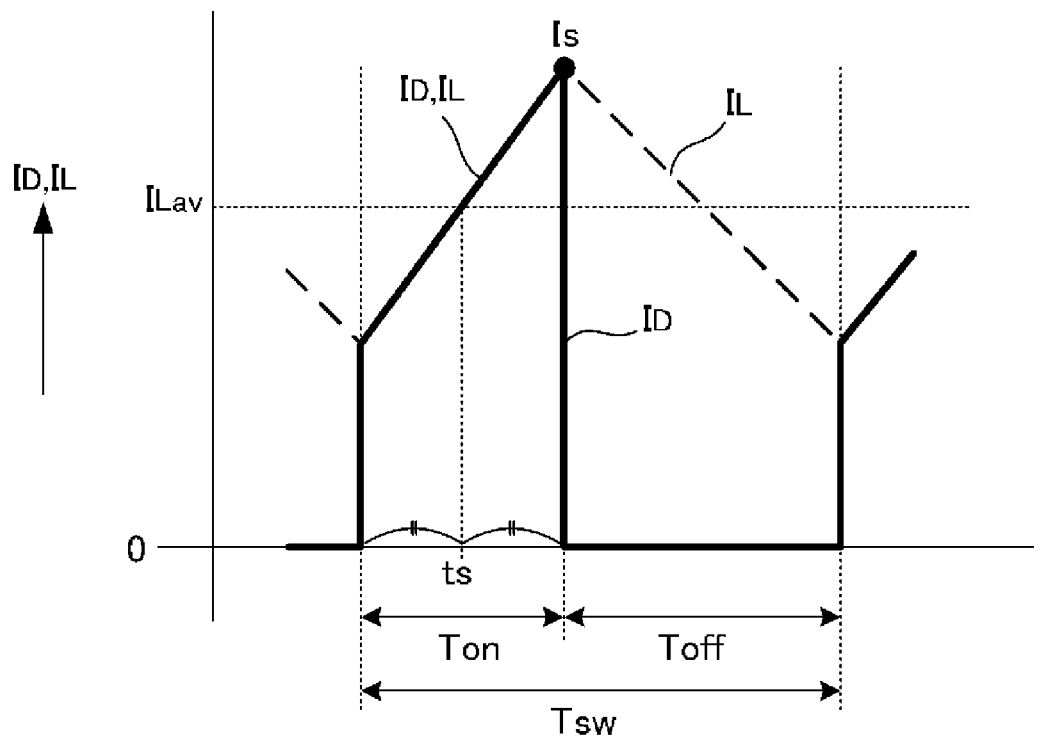
FIG. 14 is a diagram illustrating a method for obtaining an average value of a current flowing through a switching element in a PFC converter according to a seventh preferred embodiment of the present invention.

FIG. 14 is a diagram illustrating a method for obtaining an average value of a current input to the PFC converter 102 in order to perform average current control in the current continuous mode.

The value of a drain current flowing through the switching element Q1 at the end point of an on period of the switching element Q1 is represented by Is, an input voltage input from the AC input power supply is represented by Vi, the inductance value of the inductor L1 is represented by L, the on period of the switching element Q1 is represented by Ton, and an average value of the current flowing through the inductor L1 is represented by ILav.

In this case, the slope of change in the current flowing through the inductor L1 during the on period of the switching element Q1 is represented by Vi/L. Thus, the average value of the current input to the PFC converter 102 is preferably obtained by calculating $$ILav = Is - (Vi/L) \times Ton/2,$$

by sampling the current Is flowing through the switching element or inductor just before the turn-off of the switching element Q1.

Eighth Preferred Embodiment

In an eighth preferred embodiment of the present invention, a current flowing through an inductor is detected at the end point of an on period or at the start point of an off period of a switching element, thereby detecting an average value of a current input to a PFC converter.

The circuit configuration can be applied to the configuration of the PFC converter 101 illustrated in FIG. 2 according to the first preferred embodiment. Here, a description will be given of a process executed by the digital signal processing circuit 13 in the PFC converter 101 illustrated in FIG. 2 with reference to FIG. 2.

Figure 15:
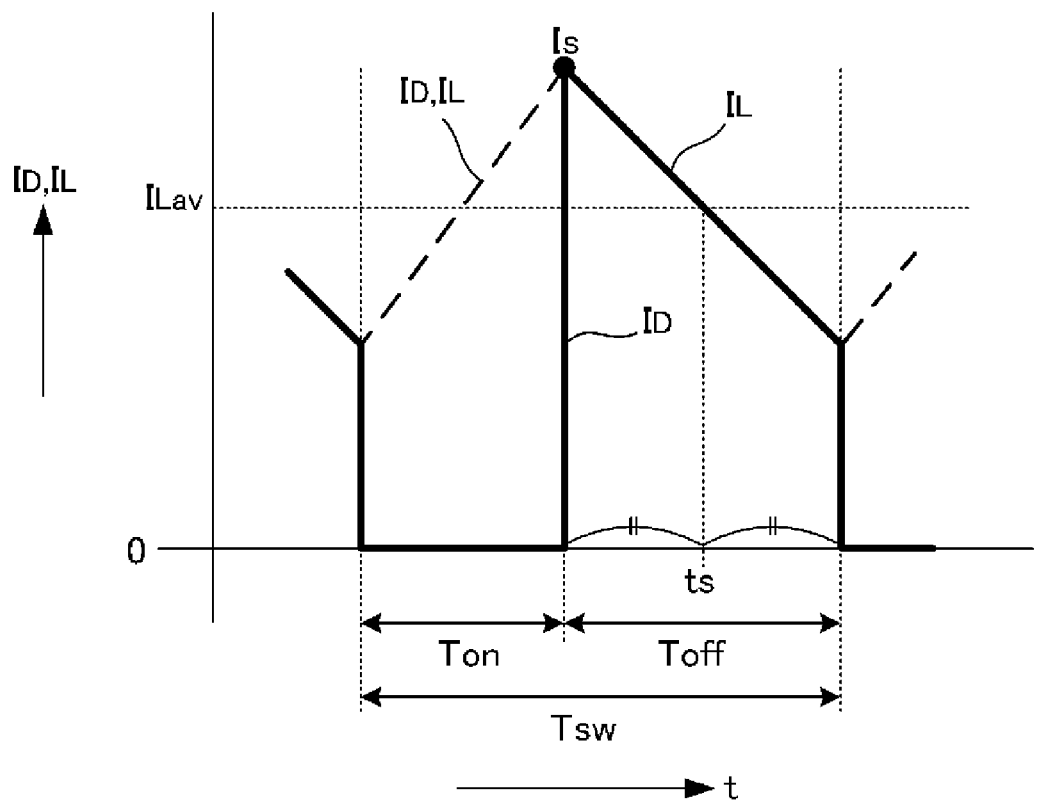
FIG. 15 is a diagram illustrating a method for obtaining an average value of a current flowing through an inductor in a PFC converter according to an eighth preferred embodiment of the preset invention.

FIG. 15 is a diagram illustrating a method for obtaining an average value of a current input to the PFC converter 101 in order to perform average current control in the current continuous mode.

The value of an inductor current flowing through the inductor L1 at the end point of an on period of the switching element Q1 is represented by Is, an input voltage input from the AC input power supply is represented by Vi, the inductance value of the inductor L1 is represented by L, the off period of the switching element Q1 is represented by Toff, and an average value of the current flowing through the inductor L1 is represented by ILav.

In this case, the slope of change in the current flowing through the inductor L1 during the off period of the switching element Q1 is represented by −(Vo−Vi)/L.

Thus, the average value of the current input to the PFC converter 101 is preferably obtained by calculating $$ILav = Is - \{(Vo - Vi)/L\} \times Toff/2,$$

by sampling the current Is flowing through the inductor at the turn-off of the switching element Q1.

In each of the above-described preferred embodiments, a current flowing through a switching element or a current flowing through an inductor is detected using a decreased voltage of a current detecting resistor. However, when using a current transformer, the primary side of the current transformer is connected to a current path, and an output voltage on the secondary side of the current transformer is used as a current detection signal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A PFC converter comprising:
a rectifier circuit arranged to rectify an AC voltage input from an AC input power supply;
a series circuit connected in a subsequent stage of the rectifier circuit and including an inductor and a switching element;
a rectifying and smoothing circuit connected in parallel to the switching element;
a switching control circuit arranged to perform on/off control on the switching element so that an average value of an input current input from the AC input power supply has a similar waveform with respect to the AC voltage;

an on-period current detecting circuit arranged to detect a current flowing through the switching element or the inductor during an on period of the switching element or an off-period current detecting circuit arranged to detect a current flowing through the inductor during an off period of the switching element; and an input current detecting circuit arranged to detect, as an average value of the input current, a value that is obtained by calculating $ILav=Is+(Vi/L) \times Ton/2$ or $ILav=Is+\{(Vo-Vi)/L\} \times Toff/2$, where a current value that is obtained by sampling a current detection signal generated by the on-period current detecting circuit or the off-period current detecting circuit at a start point of the on period or an end point of the off period of the switching element is represented by Is, an input voltage input from the AC input power supply is represented by Vi, an inductance value of the inductor is represented by L, the on period of the switching element is represented by Ton, the off period is represented by Toff, and an average value of a current flowing through the inductor is represented by ILav.

2. The PFC converter according to claim 1, wherein the on-period current detecting circuit includes a current detecting resistor that is connected in series to the switching element.

3. The PFC converter according to claim 1, wherein the on-period current detecting circuit includes a current transformer that is connected in series to the switching element.

4. The PFC converter according to claim 1, wherein the off-period current detecting circuit includes a current detecting resistor that is connected in series to a current path in which a current flows through the inductor during the off period of the switching element.

5. The PFC converter according to claim 1, wherein the off-period current detecting circuit includes a current transformer that is connected in series to a current path in which a current flows through the inductor during the off period of the switching element.

6. A PFC converter comprising:

a rectifier circuit arranged to rectify an AC voltage input from an AC input power supply;

a series circuit connected in a subsequent stage of the rectifier circuit and including an inductor and a switching element;

a rectifying and smoothing circuit connected in parallel to the switching element;

a switching control circuit arranged to perform on/off control on the switching element so that an average value of an input current input from the AC input power supply has a similar waveform with respect to the AC voltage;

an on-period current detecting circuit arranged to detect a current flowing through the switching element or the inductor during an on period of the switching element or an off-period current detecting circuit arranged to detect a current flowing through the inductor during an off period of the switching element; and an input current detecting circuit arranged to detect, as an average value of the input current, a value that is obtained by calculating $ILav=Is+(Vi/L) \times Ton/2$ or $ILav=Is+\{(Vo-Vi)/L\} \times Toff/2$, where a current value that is obtained by sampling a current detection signal generated by the on-period current detecting circuit or the off-period current detecting circuit at an end point of the on period or a start point of the off period of the switching element is represented by Is, an input voltage input from the AC input power supply is represented by Vi, an output voltage is represented by Vo, an inductance value of the inductor is represented by L, the on period of the switching element is represented by Ton, the off period is represented by Toff, and an average value of a current flowing through the inductor is represented by ILav.

7. The PFC converter according to claim 6, wherein the on-period current detecting circuit includes a current detecting resistor that is connected in series to the switching element.

8. The PFC converter according to claim 6, wherein the on-period current detecting circuit includes a current transformer that is connected in series to the switching element.

9. The PFC converter according to claim 6, wherein the off-period current detecting circuit includes a current detecting resistor that is connected in series to a current path in which a current flows through the inductor during the off period of the switching element.

10. The PFC converter according to claim 6, wherein the off-period current detecting circuit includes a current transformer that is connected in series to a current path in which a current flows through the inductor during the off period of the switching element.

11. A PFC converter comprising:

a first series circuit connected in parallel to a load and including a first switching element and a first rectifier element;

an inductor connected between a connection point of the first switching element and the first rectifier element and a first input terminal of an AC input power supply;

a second series circuit connected in parallel to the load, including a second switching element and a second rectifier element, and including a connection point of the second switching element and the second rectifier element that is connected to a second input terminal of the AC input power supply;

a smoothing circuit connected in parallel to the load;

a switching control circuit arranged to perform on/off control on the first and second switching elements so that an average value of an input current input from the AC input power supply has a similar waveform with respect to an AC voltage of the AC input power supply;

an on-period current detecting circuit arranged to detect a current flowing through the first or second switching element or the inductor during an on period of the first or second switching element or an off-period current detecting circuit arranged to detect a current flowing through the inductor during an off period of the first or second switching element; and an input current detecting circuit arranged to detect, as an average value of the input current, a value that is obtained by calculating $ILav=Is+(Vi/L) \times Ton/2$ or $ILav=Is+\{(Vo-Vi)/L\} \times Toff/2$, where a current value that is obtained by sampling a current detection signal generated by the on-period current detecting circuit or the off-period current detecting circuit at a start point of the on period or an end point of the off period of the first or second switching element is represented by Is, an input voltage input from the AC input power supply is represented by Vi, an inductance value of the inductor is represented by L, the on period of the first or second switching element is represented by Ton, the off period is represented by Toff, and an average value of a current flowing through the inductor is represented by ILav.

12. The PFC converter according to claim 11, wherein the on-period current detecting circuit includes a current detecting resistor that is connected in series to the first and second switching elements.

13. The PFC converter according to claim 11, wherein the on-period current detecting circuit includes a current transformer that is connected in series to the first and second switching elements.

14. The PFC converter according to claim 11, wherein the off-period current detecting circuit includes a current detecting resistor that is connected in series to a current path in which a current flows through the inductor during the off period of the first and second switching elements.

15. The PFC converter according to claim 11, wherein the off-period current detecting circuit includes a current transformer that is connected in series to a current path in which a current flows through the inductor during the off period of the first and second switching elements.

16. A PFC converter comprising:
a first series circuit connected in parallel to a load and including a first switching element and a first rectifier element;
an inductor connected between a connection point of the first switching element and the first rectifier element and a first input terminal of an AC input power supply;
a second series circuit connected in parallel to the load, including a second switching element and a second rectifier element, and including a connection point of the second switching element and the second rectifier element that is connected to a second input terminal of the AC input power supply;
a smoothing circuit connected in parallel to the load;
a switching control circuit arranged to perform on/off control on the first and second switching elements so that an average value of an input current input from the AC input power supply has a similar waveform with respect to an AC voltage of the AC input power supply;
an on-period current detecting circuit arranged to detect a current flowing through the first or second switching element or the inductor during an on period of the first or second switching element or an off-period current detecting circuit arranged to detect a current flowing through the inductor during an off period of the first or second switching element; and
an input current detecting circuit arranged to detect, as an average value of the input current, a value that is obtained by calculating $$ILav = Is + (Vi/L) \times Ton/2 \text{ or}$$

$$ILav = Is + \{(Vo - Vi)/L\} \times Toff/2,$$

where a current value that is obtained by sampling a current detection signal generated by the on-period current detecting circuit or the off-period current detecting circuit at an end point of the on period or a start point of the off period of the first or second switching element is represented by Is, an input voltage input from the AC input power supply is represented by Vi, an output voltage is represented by Vo, an inductance value of the inductor is represented by L, the on period of the first or second switching element is represented by Ton, the off period is represented by Toff, and an average value of a current flowing through the inductor is represented by ILav.

17. The PFC converter according to claim 16, wherein the on-period current detecting circuit includes a current detecting resistor that is connected in series to the first and second switching elements.

18. The PFC converter according to claim 16, wherein the on-period current detecting circuit includes a current transformer that is connected in series to the first and second switching elements.

19. The PFC converter according to claim 16, wherein the off-period current detecting circuit includes a current detecting resistor that is connected in series to a current path in which a current flows through the inductor during the off period of the first and second switching elements.

20. The PFC converter according to claim 16, wherein the off-period current detecting circuit includes a current transformer that is connected in series to a current path in which a current flows through the inductor during the off period of the first and second switching elements.

* * * * *